W. WATSON.
Grain Drier.
No. 6,434.
Patented May 8, 1849.
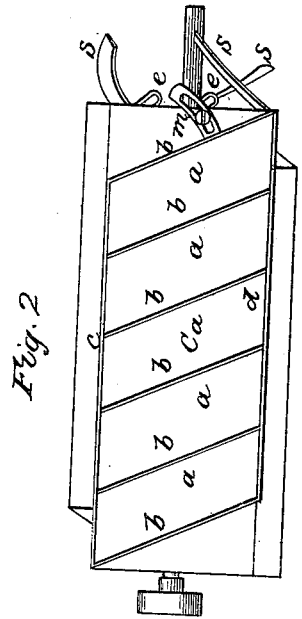
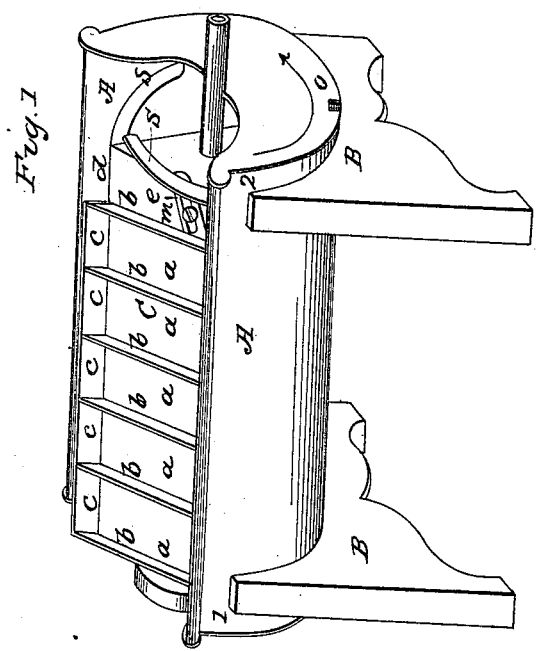

UNITED STATES PATENT OFFICE.

WILLIAM WATSON, OF CHICAGO, ILLINOIS.

DESTROYING WEEVIL IN GRAIN.

Specification of Letters Patent No. 6,434, dated May 8, 1849.

*To all whom it may concern:*

Be it known that I, WILLIAM WATSON, of Chicago, in the county of Cook and State of Illinois, have invented a new and improved apparatus for destroying "weevil" and other insects and the eggs and larvæ thereof, and separating them from wheat and other seeds upon which they commit their depreciations, reference being had to the annexed drawings of the same, making part of this specification, in which—

Figure 1 is a perspective view of the apparatus ready for operation, and Fig. 2 is a plan of the revolving prism detached from the trough.

The same letters indicate the same parts in all the figures.

My invention consists of a hollow metallic prism of three or more sides, revolving in a trough, and capable of being heated by steam introduced into its interior through its hollow axis, each side being provided with a series of oblique adjustable cells, for the purpose of subjecting successive small portions of the grain, repeatedly to the alternate action of heat and concussion, by elevating it from the bottom of the trough to the top of the prism, and thence projecting it down again into the bottom of the trough to a point slightly in advance of that whence it was taken, repeating this operation until the grain is moved along from the end of the trough at which it is admitted to that at which it is discharged, the number of times the grain is subjected to contact with the prism for the purpose of being heated, and the number of the concussions which it receives by being projected from the top of the prism down to the bottom of the trough depends upon the degree of inclination at which the cells are adjusted to the sides of the prism; the degree of desiccation which the grain undergoes, will of course depend upon the velocity with which the prism revolves. The heat dries the insects in the egg or larvæ and the agitation shakes them out of the grain in which they may have effected a lodgement, so that if the grain as it passes out of the trough be subjected to the action of a fan, the insects then excrement, and the remains of decayed matter resulting from their depredations will be effectually separated, and the grain left in a state of purity.

In the accompanying drawings, A is a trough made of either cast or sheet metal, and supported by the legs B. On each end a suitable bearing is made for the axis of the prism to turn in, and at one end of its bottom an aperture is made through which to discharge the grain, after it has been subjected to the necessary degree of concussion and desiccation.

C is the prism, which may be made of three or more sides, according to its diameter, it may be made of either cast or sheet metal, its joints being rendered steam tight. It is mounted upon a hollow axis, through one end of which the steam is admitted into its interior, and passes out through the other, after having imparted a portion of its heat to the prism. The steam is supplied by a small boiler, prepared for the purpose, or from any convenient source.

Each side of the prism has a series of cells $a$ which are formed by hinging a series of plates $b$ placed edgewise upon the prism and attached to a rib $c$ fixed upon its side, the other end being hinged to a rib $d$ which is for the purpose of preserving the sides of the cells parallel to each other. To one end of the series of cells a slotted segment $e$ is attached through which a pinching screw $m$ passes, this segment and screw enables the attendant to adjust the cells at any required degree of obliquity across the side of the prism. The end of the cell through which the grain passes as it falls down from the top of the prism, may be dispensed with, if desirable, and then the grain would strike directly against the bottom of the trough instead of striking, first upon the end of the cell, and thence glancing off against the side of the trough, as would be the case with cells constructed as represented in the drawing.

The operation is as follows: After the prism has been properly heated the grain is introduced into the end of the trough marked 1 by means of a spout or otherwise, from a hopper or bin, the prism is then turned in the direction of the arrow which moves the grain along gradually toward the end of the trough marked 2, where it is discharged through an aperture $o$ in the end of the same by the action of the oblique scraper 3. A screen and fan may be here placed to receive and separate it from the insects and other foreign matter which may have been mixed with it.

I do not claim the use of heat separately, in the destruction of the weevil, as my invention, when the same is not combined with concussion of the grain infested with this insert. Nor do I claim as new the construction of a heater of any other than a prismatic form with wide sides having oblique adjustable cells therein. But What I do claim as my invention and desire to secure by Letters Patent is—

The application of the combined action of heat, and concussion to grain or other seeds for the destruction of weevil and other insects and the eggs and larvæ thereof infesting the same, and separating other foreign matter therefrom by means of a hollow prism heated from its interior and turning in a trough, the prism being surrounded by adjustable cells attached obliquely across its sides; the whole being arranged and operated substantially in the manner and for the purposes herein set forth.

WM. WATSON.

Witnesses:
R. ARMSTRONG,
W. HART.